(12) United States Patent
Liang et al.

(10) Patent No.: US 7,752,479 B2
(45) Date of Patent: Jul. 6, 2010

(54) CPU FREQUENCY REGULATING CIRCUIT

(75) Inventors: Hsin-Wang Liang, Taipei Hsien (TW);
Han-Chiang Chuang, Taipei Hsien (TW); Hung-Ju Chen, Taipei Hsien (TW); Chien-Chung Huang, Fremont, CA (US); Wen-Lung Liang, Taipei Hsien (TW); Chih-Liang Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 843 days.

(21) Appl. No.: 11/563,149

(22) Filed: Nov. 25, 2006

(65) Prior Publication Data

US 2007/0170963 A1    Jul. 26, 2007

(30) Foreign Application Priority Data

Dec. 30, 2005    (CN) .................. 2005 1 0121402

(51) Int. Cl.
  *G06F 1/04*    (2006.01)
  *G06F 1/32*    (2006.01)
(52) U.S. Cl. ...................................... 713/500; 713/322

(58) Field of Classification Search ................. 713/500, 713/300
See application file for complete search history.

(56) References Cited

U.S. PATENT DOCUMENTS

| 6,470,289 | B1 * | 10/2002 | Peters et al. ................. 702/132 |
| 6,639,391 | B2 | 10/2003 | Huang et al. |
| 6,826,702 | B1 * | 11/2004 | Shibuya ....................... 713/320 |
| 6,885,252 | B2 | 4/2005 | Hsu et al. |
| 7,205,733 | B2 * | 4/2007 | Xiong et al. ........... 318/400.11 |
| 7,219,246 | B2 * | 5/2007 | Julicher et al. .............. 713/322 |
| 7,353,133 | B2 * | 4/2008 | Park ........................... 702/130 |
| 7,373,531 | B2 * | 5/2008 | Shimizu et al. ............. 713/300 |

* cited by examiner

*Primary Examiner*—Thomas Lee
*Assistant Examiner*—Eric Chang
(74) *Attorney, Agent, or Firm*—Wei Te Chung

(57) ABSTRACT

An exemplary CPU frequency regulating circuit includes a detecting circuit, and a comparing circuit. The detecting circuit receives a PWM signal from a super I/O chipset, and converts the PWM signal to a load voltage responsive to a workload of a CPU. The comparing circuit is coupled to the detecting circuit for receiving the load voltage, and compares the load voltage with a reference voltage, and adjusts a frequency of the CPU according to a result of the comparison.

8 Claims, 1 Drawing Sheet

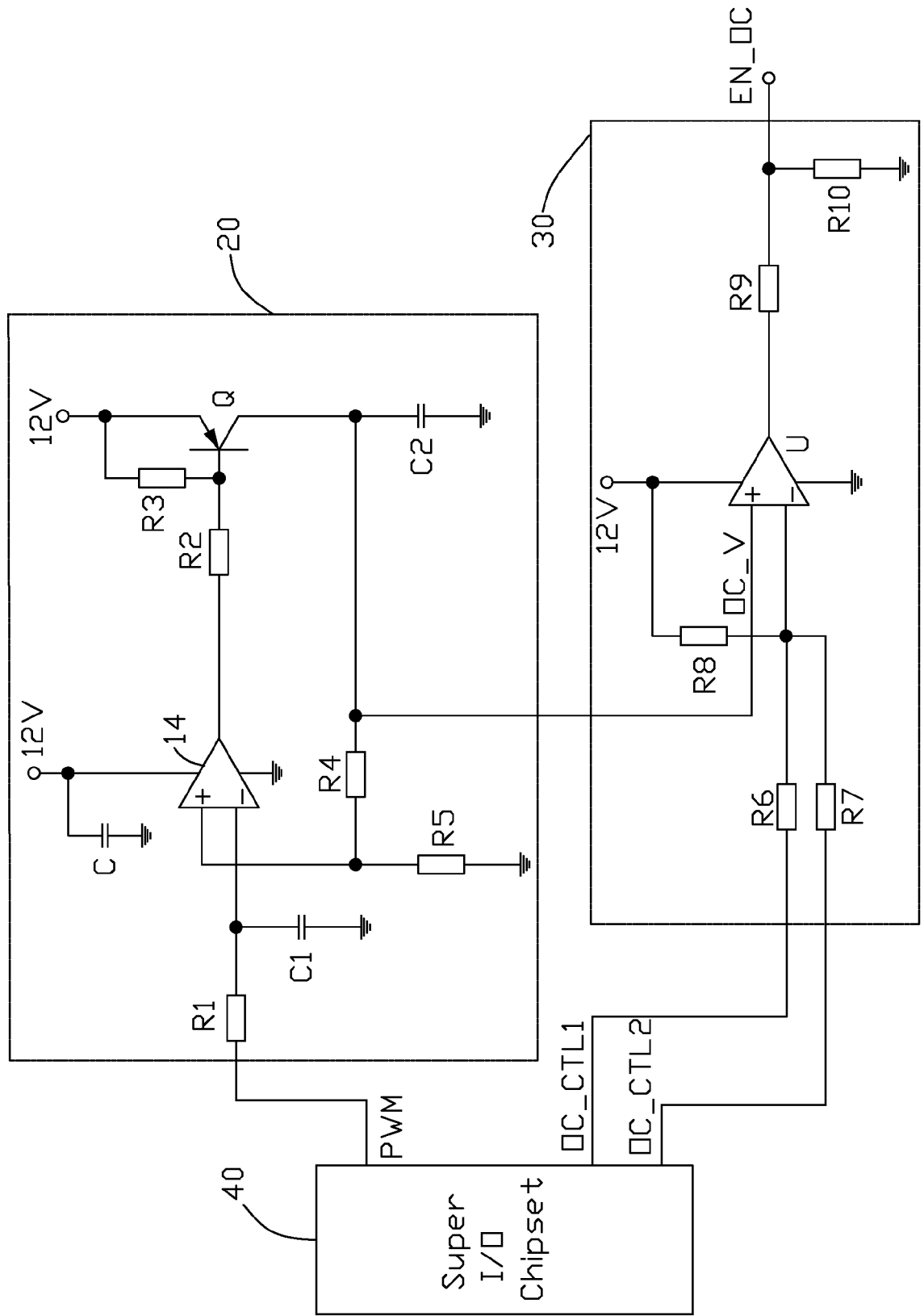

CPU FREQUENCY REGULATING CIRCUIT

BACKGROUND OF THE INVENTION

1. Field of the Invention

The present invention relates to regulating circuits, and particularly to a central processing unit (CPU) frequency regulating circuit.

2. Description of Related Art

Conventionally, working frequency of a computer is set by manipulating jumpers or other switches on a motherboard of the computer. The jumpers are changed in accordance with instructions in a user guide of the motherboard so as to change a CPU multiple frequency factor and to control the frequency generation of a frequency generator. This, however, may be troublesome to ordinary consumers since most people are not familiar with such a technique, and thus, although the user may follow the instructions of the user guide, it is still possible and very often that the computer user cannot perform the frequency modification operation correctly.

An incorrect setting of the working frequency may result in damage to the CPU. Therefore to overcome such a problem, some of the computer motherboard manufacturers provide a solution which allows the computer user to set the multiple frequency factor directly on the computer screen, similar to the general setting operation of the computer BIOS.

The conventional way of setting the working frequency is to perform the operation under the condition that the computer is already booted. The setting operation provides frequency information and a frequency switching address signal, which after being decoded, is stored in a storage device. In response to the frequency information, the storage device generates a corresponding multiple frequency factor signal and a frequency selection signal, which are applied to the CPU, and a frequency generator signal and a reset signal are sent from a resetting unit to the CPU and the system chipset to enter a hardware-resetting mode. After the resetting operation, the system chip supplies a reset feedback signal to clear the previous status of the resetting unit which permits the CPU and the system chipset to operate based on the newly selected multiple frequency factor and working frequency. Although this way provides an effective switching operation between different frequencies, it requires additional parts, such as the resetting unit and the storage device. This device and unit may constitute a substantial cost loss to the computer main board manufacturers who usually mass produce computer main boards so that even a tiny increase of the cost for each piece of computer main board would eventually result in a major loss of money for the computer main board manufacturers.

What is needed, therefore, is a CPU frequency regulating circuit for selecting a frequency of the CPU automatically at a low cost.

SUMMARY OF THE INVENTION

An exemplary CPU frequency regulating circuit includes a detecting circuit, and a comparing circuit. The detecting circuit receives a pulse width modulation (PWM) signal from a super I/O chipset, and converts the PWM signal to a load voltage responsive to workload of a CPU. The comparing circuit is coupled to the detecting circuit for receiving the load voltage, and compares the load voltage with a reference voltage, and adjusts a frequency of the CPU according to the comparison.

Other advantages and novel features will become more apparent from the following detailed description when taken in conjunction with the accompanying drawing, in which:

BRIEF DESCRIPTION OF THE DRAWINGS

The drawing is a circuit diagram of one embodiment of a CPU frequency regulating circuit in accordance with the present invention.

DETAILED DESCRIPTION OF THE INVENTION

Referring to the drawing, a CPU frequency regulating circuit in accordance with a preferred embodiment of the present invention includes a detecting circuit 20, and a comparing circuit 30. The detecting circuit 20 receives a pulse width modulation (PWM) signal with a fixed frequency output from a super I/O chipset 40. Generally, a duty cycle of the PWM signal increases according to a workload of a CPU in a computer system. The detecting circuit 20 converts the PWM signal to a smooth and stable load voltage OC_V. The comparing circuit 30 receives the load voltage OC_V and generates a control signal EN_OC according to the load voltage OC_V. The super I/O chipset 40 receives the control signal EN_OC and adjusts a frequency of the CPU.

The detecting circuit 20 includes an amplifier 14 and a transistor Q. The PWM signal is applied to an inverting terminal of the amplifier 14 via a resistor R1, and a node between the resistor R1 and the inverting terminal of the amplifier 14 is connected to ground via a capacitor C1. A power terminal of the amplifier 14 is connected to a 12V power source, and a ground terminal of the amplifier 14 is grounded. An output of the amplifier 14 is connected to a base of the transistor Q via a resistor R2. An emitter of the transistor Q is connected to the base of the transistor Q via a resistor R3, and connected to the 12V power source. A collector of the transistor Q is grounded via a second capacitor C2. A node between the collector of the transistor Q and the capacitor C2 is connected to ground via a resistor R4 and a resistor R5. A node between the resistors R4 and R5 is connected to a non-inverting terminal of the amplifier 14. The resistors R4 and R5 form a feedback circuit of the amplifier 14.

The comparing circuit 30 includes a comparator U having a non-inverting terminal connected to a node between the resistor R4 and the capacitor C2, and an inverting terminal connected to the 12V power source via a resistor R8. Two logic signals OC_CTL1 and OC_CTL2 are applied to the inverting terminal of the comparator U via a resistor R6 and a resistor R7 respectively. The two logic signals OC_CTL1 and OC_CTL2 are generated in the super I/O chipset 40. A power terminal of the comparator U is connected to the 12V power source, and a ground terminal of the comparator U is grounded. An output of the comparator U is connected to ground via two resistors R9 and R10. The control signal EN_OC generated at a node between the resistors R9 and R10 is applied to the super I/O chipset 40.

The load voltage OC_V at the non-inverting terminal of the comparator U is a sampling voltage of the workload of the CPU. A reference voltage Vref at the inverting terminal of the comparator U is determined by the state of the two logic signals OC_CTL1 and OC_CTL2.

In the preferred embodiment, a low voltage signal is represented as "0" and a high voltage signal is represented as "1." Therefore a combination of the two logic signals OC_CTL1 and OC_CTL2 is represented by a two-digit binary sequence. For example, if both signals are low voltage signals, the combination of the logic signals OC_CTL1 and OC_CTL2 is represented as "00." If both logic signals of are high voltage signals, the combination of the logic signals OC_CTL1 and OC_CTL2 is represented as "11." The preferred resistances of the resistors R6, R7, and R8 are 130 ohm, 330 ohm, and 90 ohm respectively.

When the combination of the logic signals OC_CTL1 and OC_CTL2 is represented as "00", the resistors R6 and R7 are all connected to ground. At this moment, the reference voltage Vref at the inverting terminal of the comparator U is determined by the following equation:

$$Vref = \frac{R6\|R7}{R6\|R7 + R8} * 12 = 6 \text{ V}.$$

when the combination of the logic signals OC_CTL1 and OC_CTL2 is represented as "01", the resistor R6 is connected to ground, and the resistor R7 is not connected in the circuit. At this moment, the reference voltage Vref at the inverting terminal of the comparator U is determined by the following equation:

$$Vref = \frac{R6}{R6 + R8} * 12 = 7 \text{ V}.$$

when the combination of the logic signals OC_CTL1 and OC_CTL2 is represented as "10", the resistor R6 is not connected in the circuit, and the resistor R7 is connected to ground. At this moment, the reference voltage Vref at the inverting terminal of the comparator U is determined by the following equation:

$$Vref = \frac{R7}{R7 + R8} * 12 = 9.5 \text{ V}.$$

When the combination of the logic signals OC_CTL1 and OC_CTL2 is represented as "11", the resistors R6 and R7 are not connected in circuit. At this moment, the reference voltage Vref at the inverting terminal of the comparator U is 12V. Table 1 shows signal levels of the two logic signals $OC_{13}$ CTL1 and OC_CTL2 and corresponding reference voltages.

TABLE 1

| OC_CTL1 | OC_CTL2 | Vref |
|---------|---------|------|
| 0 | 0 | 6 V |
| 0 | 1 | 7 V |
| 1 | 0 | 9.5 V |
| 1 | 1 | 12 V |

The example presented below is designed to illustrate how to adjust the CPU frequency when the combination of the logic signals $OC_{13}$ CTL1 and OC_CTL2 is represented as "00". The reference voltage Vref is 6V. At the instant the computer system is turned on, the computer system involving the CPU frequency regulating circuit is started, the PWM signal is converted into an analog output signal by the resistor R1 and the capacitor C1 to be applied to the non-inverting terminal of the amplifier 14, a voltage at the inverting terminal of the amplifier 14 is nearly 0V at the moment of starting, and a voltage at the output terminal of the amplifier 14 is also 0V. The transistor Q is turned on, a high voltage at the collector of the transistor Q is applied to the non-inverting terminal of the amplifier 14 via the feedback circuit (R4 and R5), so the voltage at the non-inverting terminal of the amplifier 14 increases. When the voltage at the non-inverting terminal of the amplifier 14 increases to equal the voltage at the inverting terminal of the amplifier 14, the load voltage $OC_{13}$ V is a stable voltage and compared with the reference voltage Vref, and the CPU works at a normal frequency.

When the load of the CPU increases, for example, a 3D game is running in the computer system, a duty cycle of the PWM signal increases, the voltage at the inverting terminal of the amplifier 14 increases, because of the feedback circuit, the voltage at the non-inverting terminal of the comparator 14 increases. Accordingly, the load voltage OC_V increases to a higher stable voltage and compared with the reference voltage Vref. If the load voltage OC_V is higher than the reference voltage Vref, the comparator U outputs the EN_OC signal to the super I/O chipset 40 to adjust a clock circuit of the CPU to provide a higher frequency to the CPU. If the load voltage OC_V is lower than the reference voltage Vref, the frequency of the CPU remains unchanged.

The operation of adjusting frequency of the CPU of other combinations of the logic signals OC_CTL1 and OC_CTL2 is similar to the previous example. The CPU frequency regulating circuit detects the load voltage of the CPU for selecting an appropriate frequency to the CPU according to a working condition.

It is believed that the present invention and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A central processing unit (CPU) frequency regulating circuit comprising:
   a detecting circuit for receiving a pulse width modulation (PWM) signal from a super I/O chipset and converting the PWM signal to a load voltage responsive to workload of a CPU; and
   a comparing circuit coupled to the detecting circuit for receiving the load voltage, and comparing the load voltage with a reference voltage, and outputting a control signal responsive to the comparison result to the super I/O chipset to allow the super I/O chipset to adjust a frequency of the CPU according to the comparison result.

2. The CPU frequency regulating circuit as claimed in claim 1, wherein the detecting circuit comprises an amplifier and a transistor, the PWM signal is applied to an inverting terminal of the amplifier via a first resistor, a node between the first resistor and the inverting terminal of the amplifier is connected to ground via a first capacitor, an output of the amplifier is connected to a base of the transistor via a second resistor, an emitter of the transistor is connected to the base of the transistor via a third resistor, and also connected to a power source, a collector of the transistor is grounded via a second capacitor, a node between the collector of the transistor and the second capacitor is connected to ground via a fourth resistor and a fifth resistor, a node between the fourth resistor and the fifth resistor is connected to a non-inverting terminal of the amplifier.

3. The CPU frequency regulating circuit as claimed in claim 2, wherein a power terminal of the amplifier is connected to the power source, and a ground terminal of the amplifier is grounded.

4. The CPU frequency regulating circuit as claimed in claim 3, wherein the comparing circuit includes a comparator having a non-inverting terminal connected to a node between the fourth resistor and the second capacitor, and an inverting terminal connected to the power source via a sixth resistor, two logic signals are applied to the inverting terminal of the comparator via a seventh resistor and an eighth resistor respectively, the two logic signals are generated in the super I/O chipset, an output of the comparator is connected to ground via a ninth resistor and a tenth resistor, the control signal is output at a node between the ninth resistor and the tenth resistor.

5. A central processing unit (CPU) frequency regulating circuit comprising:
- a digital-analog converter for converting a pulse width modulation (PWM) signal to an analog signal, the PWM signal changing according to changes in a workload of a CPU;
- an amplifier circuit for converting the analog signal to a stable load voltage; and
- a comparing circuit coupled to the amplifier circuit for receiving the stable load voltage, comparing the load voltage with a predetermined reference voltage, and adjusting, a frequency of the CPU according to the comparison result.

6. The CPU frequency regulating circuit as claimed in claim 5, wherein the digital-analog converter comprises an integral circuit that has a first resistor and a first capacitor connected in series, an input end of the first resistor receives the PWM signal, the first capacitor is grounded, and the analog signal is output at a node between the first resistor and the first capacitor.

7. The CPU frequency regulating circuit as claimed in claim 6, wherein the amplifier circuit comprises an amplifier and a transistor, the analog signal is applied to an inverting terminal of the amplifier, an output of the amplifier is connected to a base of the transistor via a second resistor, an emitter of the transistor is connected to the base of the transistor via a third resistor, and also connected to a power source, a collector of the transistor is grounded via to second capacitor, as node between the collector of the transistor and the second capacitor is connected to ground via a fourth resistor and a fifth resistor, and a node between the fourth resistor and the fifth resistor is connected to a non-inverting terminal of the amplifier.

8. The CPU frequency regulating circuit as claimed in claim 5, wherein the comparing, circuit includes a comparator having a non-inverting terminal connected to a node between the fourth resistor and the second capacitor, an inverting terminal connected to the power source via a sixth resistor, two logic signals are applied to the inverting terminal of the comparator via a seventh resistor and an eighth resistor respectively, the two logic signals are generated in a super I/O chipset, an output of the comparator is connected to ground via a ninth resistor and a tenth resistor, a result of the comparison is generated at a node between the ninth resistor and the tenth resistor.

* * * * *